April 2, 1940.  O. B. CROWELL ET AL  2,196,060
COATING PROCESS
Original Filed Oct. 1, 1935

Inventor:
Orby B. Crowell,
Frederick A. Mc Gregor,
by Harry E. Dunham
Their Attorney.

Patented Apr. 2, 1940

2,196,060

UNITED STATES PATENT OFFICE 2,196,060

COATING PROCESS

Orby B. Crowell and Frederick A. McGregor, Toronto, Ontario, Canada, assignors to General Electric Company, a corporation of New York Application October 1, 1935, Serial No. 43,026
Renewed September 28, 1938

4 Claims. (Cl. 91—68)

The present invention relates to a coating composition for coating rubber articles, electrical conductors, and the like.

An object of our invention is to provide an improved coating composition which has sufficient elasticity and resistance to flexing and abrasion to render it suitable for use on rubber articles.

Another object of our invention is to provide an article coated with a coating embodying our invention.

For a consideration of what we believe to be novel and our invention, attention is directed to the accompanying description and the claims appended thereto.

Figure 1:
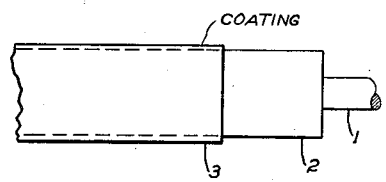
Figure 2:
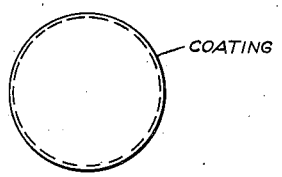
Figure 3:
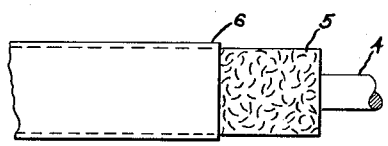

In the drawing, Fig. 1 is a fragmentary view of a rubber covered conductor having a coating embodying our invention applied thereto; Fig. 2 is a perspective view of a rubber ball having a coating embodying our invention applied thereto; and Fig. 3 is a fragmentary view of an electrical conductor having fibrous insulation sealed by a coating embodying our invention.

The rubber base used in the coating composition comprises crude rubber which has been broken down by extreme mastication so that it is dead or flat milled. If the coating is to be light colored, pale crepe rubber is preferably used to avoid discoloration. This breaking down of the rubber may be obtained by milling 100 lbs. of pale crepe on a 60 inch mill, the rolls of which are rightly set and are cooled by cooling water at a temperature between 40° and 50° F. The 60 inch mill has a speed of 19 R. P. M. on the front roll, and the ratio of surface speed is 1.1 to 1; that is, the back roll surface speed is 1.1 times the front roll surface speed. At the end of this milling, the rubber is an inert semifluid mass. It has a plasticity figure of from 72 to 75 as determined by the Goodrich simplified plastometer 24 hours after milling. Since this plasticity figure is important, it should be checked after the milling of each batch of rubber. Other size mills with different ratios of surface speeds may be used so long as plasticity figures within this range are obtained.

Suitable sized batches of the dead milled rubber and the desired pigments are then placed in a mixing mill and thoroughly mixed. Due to the broken down condition of the rubber, the pigment is intimately dispersed in and thoroughly wetted by the rubber by this mixing. The time for mixing is not critical. After mixing, the batches are taken off the mixing mill in single slabs about ¼ inch thick to the cooling table where the slabs are soap stoned and stored. Below are tabulations of a few mixtures of pigment and rubber which have been found to be suitable. The pigments listed are well known to the rubber compounding art.

*Black*

| | |
|---|---|
| Dead milled crepe | 30 |
| Barytes | 32½ |
| Carbon black | 5 |
| Pulpro whiting | 28½ |
| Boiled oil | 4 |
| | 100 |

*Dull white*

| | |
|---|---|
| Dead milled crepe | 30 |
| Titanox A | 65 |
| Stearic acid | 5 |
| | 100 |

*Dull black*

| | |
|---|---|
| Dead milled crepe | 30 |
| Barytes | 32½ |
| Carbon black | 5 |
| Whiting | 32½ |
| Stearic acid | 2 |
| | 102 |

*Clear*

| | |
|---|---|
| Dead milled crepe | 80 |
| Stearic acid | 20 |
| | 100 |

In the preparation of a solution of the coating composition, a suitable quantity of the mixture of the dead milled rubber and pigment is placed in a drum which is partially filled with solvent naphtha and allowed to stand in a warm room for from 48 to 60 hours. The drum is then taken to a stirrer where more solvent is added, and the solution is stirred until smooth. When smooth, the drum and contents are removed from the stirrer, the evaporation of solvent replaced, and the drum sealed. Other solvents than solvent naphtha may be used, for example, benzol, toluol, and gasoline. Gasoline is not so desirable.

Due to the highly broken-down condition of the rubber, a much greater amount of the rubber can be dissolved in the solvent for a given solution viscosity than in the case of rubber which has been only partially broken down. In addition to a greater solids content, the solution of dead milled rubber has greater adherence. This means that the coating solution will have better covering properties. Before using, the solution may be thinned by the addition of more solvent.

The coating solution may be applied by means of dipping, brushing, or spraying. Due to use of dead milled rubber, this coating is very easily applied in a thin coat which has excellent covering properties, exceptional adherence, and is exceedingly smooth. If the rubber were only partially broken down, the coating would not stick as readily. The inertness or lack of elasticity of the dead milled rubber is the important factor. After the coating is applied, the solvent is evaporated and the coating is vulcanized, for example, by means of sulphur chloride fumes. After the vulcanization of the coating, the rubber in the coating recovers a great deal of its elasticity and also possesses good insulating properties. This renders the coating suitable for use on insulated electrical conductors where the insulating properties are important. The coating also offers good mechanical protection to flexing and abrasion and has remarkable adherence.

Before applying the solution to the surface, the surface should be clean and free from materials such as paraffin wax, talc, or soap, which interfere with the union of the coating. The use of staining accelerators and antioxidants and coal tar in the rubber article being coated should be avoided, as these materials tend to discolor a light-colored coating due to migration. In dark-colored coatings, the above materials are not objectionable.

By mixing suitable accelerators with the solution, the coating may be vulcanized by heat. In addition, sulphur and other suitable vulcanizing agents may be mixed with the solution and the coating vulcanized by passing the coated article through a hot water bath containing a migratory accelerator similar to those used for latex. Both of these methods are more suitable for continuous process manufacture.

The dull or flat coating compositions may be made by using the same mixture specified for the glass coats and incorporating the pigment in the stirrer instead of in the mixing mill. Another method of producing dull or flat coating compositions is to decrease the rubber content, thereby increasing pigment content.

In the drawing, Fig. 1 shows a perspective view of a rubber covered electrical conductor to which the coating composition has been applied. The numeral 1 indicates the electrical conductor; the numeral 2 the rubber covering; and the numeral 3 the coating. The thickness of the coating is exaggerated for the purpose of illustration. The coating provides a tough and durable finish of the desired color which will adhere to the conductor without cracking or checking during flexing of the conductor and abrasion of the coating. The coating 3 is also an insulating coating.

Fig. 2 is a perspective view of a rubber ball to which the coating composition has been applied. In this use, the coating has proved to be sufficiently elastic and adherent so that cracking and checking of the coating do not occur during the normal use of the ball. This shows that the coating has good adherence and good resistance to flexing and mechanical abrasion.

In Fig. 3 the conductor 4 is covered by a fibrous insulating material 5 over which is applied a layer 6 of the coating composition. In this case, the coating acts as a seal which prevents moisture reaching the fibrous insulating material 5. The toughness, adherence, and durability of the coating, and the resistance of the coating to flexing, and mechanical abrasion make this coating particularly suitable for this type of conductor.

What we claim as new and desire to secure by Letters Patent of the United States is:

1. The method of coating an article which comprises applying a film of solution of a solvent and rubber masticated by milling until it has a plasticity figure of from 72 to 75 by the Goodrich simplified plastometer, evaporating the solvent, and vulcanizing the film.

2. The method of coating an article which comprises applying a film of solution of a solvent and rubber masticated by milling until it has a plasticity figure of from 72 to 75 by the Goodrich simplified plastometer, evaporating the solvent, and vulcanizing the film by sulphur chloride fumes.

3. The method of coating an article which comprises applying a film of solution of a solvent and rubber masticated by milling until it has a plasticity figure of from 72 to 75 by the Goodrich simplified plastometer, evaporating the solvent, and vulcanizing the film by subjecting the article to a bath containing a migratory accelerator.

4. An article coated with a film applied from a solution of a solvent and rubber masticated by milling until it has a plasticity figure of from 72 to 75 by the Goodrich simplified plastometer, the solvent being evaporated and the film being vulcanized.

ORBY B. CROWELL.
FREDERICK A. McGREGOR.